US005889993A

United States Patent [19]
Kroeger et al.

[11] Patent Number: 5,889,993
[45] Date of Patent: Mar. 30, 1999

[54] PREDICTIVE EVENT TRACKING METHOD

[75] Inventors: Thomas M. Kroeger, Santa Cruz; Darrell D. E. Long, Soquel, both of Calif.

[73] Assignee: The Regents of the University of California, Oakland, Calif.

[21] Appl. No.: 730,418

[22] Filed: Oct. 15, 1996

[51] Int. Cl.[6] .................................................. G06F 11/00
[52] U.S. Cl. ................ 395/704; 395/183.03; 395/183.15
[58] Field of Search ............................... 395/704, 183.01, 395/183.03, 183.06, 183.14, 183.15, 183.2, 701, 705, 500, 683; 364/240, 243, 243.41, 243.4, 243.44

[56] References Cited

U.S. PATENT DOCUMENTS

| | | | |
|---|---|---|---|
| 4,740,349 | 4/1988 | Loftus et al. | 376/216 |
| 5,493,504 | 2/1996 | Minato | 364/488 |
| 5,528,701 | 6/1996 | Aref | 382/178 |
| 5,564,119 | 10/1996 | Krawchuk et al. | 707/4 |
| 5,642,478 | 6/1997 | Chen et al. | 395/183.21 |

OTHER PUBLICATIONS

Kuenning et al., "An Analysis of Trace Data for Predictive File Caching in Mobile Computing", Proceedings of USENIX Summer Technical Conference, pp. 291–303, USENIX, 1994.

Kuenning et al., "The Design of the Seer Predictive Caching System", Workshop on Mobile Computing Systems and Applications, pp. 37–43, IEEE, Dec. 1994.

Cao et al., "Implementation of Performance of Integrated Application–Controlled Caching, Prefetching, and Disk Scheduling", Princeton University Technical Report TRCS95–493, 1995.

Baker et al., "Measurements of a Distributed File System", Proceedings of the 13th ACM Symposium on Operating Systems, Association for Computing Machinery SIGOPS, pp. 198–212, Oct. 13, 1991.

Vitter et al., "Optimal Prefetching via Data Compression", Brown University Technical Report CS–91–46, Jul. 1991.

Griffioen et al., "Performance Measurements of Automatic Prefetching", Parallel and Distributed Computing Systems, Orlando, FL 1995.

Krishnan et al., "Optimal Prediction for Prefetching in the Worst Case", Duke University Technical Report Duke–TR–1993–26, Jan. 1993.

Krishnan, P., "Online Prediction Algorithms for Databases and Operating Systems", Brown University, May 1995.

Curewitz et al., "Practical Prefetching Via Data Compression", Proceedings of 1993 ACM,pp. 257–266, May 1993.

Griffioen et al., "Improving File System Performance Via Predictive Caching", Parallel and Distributed Computing Systems '95, Sep. 21–23, 1995, pp. 165–170.

Griffioen et al., "Reducing File System Latency Using a Predictive Approach", Proceedings of USENIX Summer 1994 Technical Conference, pp. 197–207, Jun. 1994.

*Primary Examiner*—James P. Trammell
*Assistant Examiner*—Demetra R. Smith
*Attorney, Agent, or Firm*—John P. O'Banion

[57] ABSTRACT

A method of tracking events and their sequences in a computer system and predicting the probability of future events using a data structure that represents the predictive nature of the system after an initial event correlating to an object in the system. The invention reduces memory requirements and computational complexity by partitioning a trie into subtries where each subtrie represents a set of sequences of events, statically limiting the size of the partitions by limiting the number of descendants below the node defining the partition, and refreshing parts of the set of children and releasing slots occupied by particular descendants when additional space is needed. In addition, each partition can be attached to the object which it represents and moved in and out of memory with that object. In this way, data structures which would otherwise grow as large as $N^O$ and which have a computational complexity of predictions on the order of $O \times N$, where N is the number of objects modeled and O is the model order, will be limited in size to N which, in turn, limits the computational complexity to order O.

18 Claims, 7 Drawing Sheets

| Node | Object Identifier | Count | Pointer To First Child | Pointer To First Sibling |
|------|-------------------|-------|------------------------|--------------------------|
| 0 | 32/64 Bits | 16 Bits | 4 Bits | 4 Bits |
| • | • | • | • | • |
| • | • | • | • | • |
| • | • | • | • | • |
| 15 | | | | |

FIG. – 5

PREDICTIVE EVENT TRACKING METHOD

BACKGROUND OF THE INVENTION

This invention was made with Government support under Grant No. N0001 4-92-J-1807 awarded by the Office of Naval Research. The Government has certain rights in this invention.

1. Field of the Invention

The present invention pertains generally to a method for efficiently tracking and predicting events in a computer system primarily for activities such as pre-fetching and replacement decisions in cache systems (e.g., file system buffer caches, distributed system event caches, and disk controller input/output (I/O) caches), and more particularly to reducing computational complexity and memory requirements by placing static limits on subtrie size and by paging subtries with the events with which they are associated. The invention also provides the basis for computationally efficient data compression.

2. Description of the Background Art

Finite multi-order context models for event prediction are widely used in data compression, and *Prediction by Partial Match* (PPM) is a well known method for such use. PPM maintains a data structure with a plurality of substructures based on the previously seen nature of a system. An example of such a data structure is a trie having a plurality of nodes in which each node represents a sequence of events that has occurred at least once. Each node can be thought of as representing an individual event that occurred after the sequence represented by its parent, and contains a count of the number of times that its sequence has occurred. As new events occur, the trie is updated by recording the sequence of events that have occurred. At any point in the stream of events, the next event can be described as occurring after the sequence of events that has just occurred. These sequences can also be considered as part of the system's current state and can vary depending upon the length of sequences chosen. For example, for the sequence of events CACBCA, the next event can be described as occurring after A, CA, BCA, CBCA, ACBCA or CACBCA. The length of these sequences is called their "order" and the sequences that describe the conditions under which the next event will occur are called "contexts." In the example above, the sequence BCA would be called a third order context. To prevent the trie from growing too large, the maximum order or length of the sequences tracked is generally limited. For example, where m is used to denote this limit, there would be a total of m+1 contexts (0 through m) that describe the file system's current state at any point in time. In order to update the trie and use it to determine future events, an array of pointers 0 through m is typically maintained to point to the current contexts ($C_0$ through $C_m$). With each new event seen, a new current state is determined by updating each context in this array to reflect the addition of the new event. A new $C_k$ is then generated by examining the children of the old $C_{k-1}$, searching for a child that represents the new event. If such a child exists, then this context (or sequence) $C_{k-1}$ has occurred before, and is represented by this child's node. In that case, the $k^{th}$ element of the array is set to point to this child's node and its count is incremented. If no such child is found, then this is the first time that such a context has occurred, and a child is created to represent this event and the $k^{th}$ element of the array is set to point to its node. An important property of the trie is that the frequency count for each current context is equal to the sum of its children's counts plus one. As each new context is generated, the children of that context, if any, are examined to determine how likely they are to be the next event. Using the relationship $Count_{child}/(Count_{Parent}-1)$, a maximum likelihood estimation of the probability of the child's event occurring can be generated.

With the rapid increase of processor speeds, the bottleneck of input/output (I/O) and network system latency has become a critical issue in computer system performance. Standard least recently used (LRU) based caching techniques offer some assistance but, by ignoring any relationships that exist between system events, they fail to make full use of the information available. As an alternative to LRU-based caching techniques, data compression event modeling techniques such as PPM, described above, have been used to drive a virtual memory cache where a finite number of most probable items are pre-fetched. A significant problem with using models such as PPM, however, is that the size of the data structures needed for such a model can quickly become too large for many applications. The result is that space requirements and the associated computational complexity cause models such as PPM to be impractical in practice. As a result, in applications where the number of different possible events (e.g., letters of the alphabet or blocks on a disk) is large, such predictive methods have only seen limited success.

It is also known to accumulate frequency counts of files that fall within a window after each file access, and to use the frequency counts to drive a pre-fetching cache. Another known approach is to have the application program inform the file system which files to prefetch. This approach, however, requires the application programs to be modified and fails to make use of any relationships that exist across applications.

Therefore, there is a need for a method for predicting sequences of events using predictive models such as PPM-but without the inherent computational complexity or memory requirements. The present invention satisfies those needs, as well as others, and overcomes the deficiencies found in previously developed predictive techniques.

SUMMARY OF THE INVENTION

The present invention pertains a method of tracking sequences of events, predicting the probability of future events, and using this information for cache management decisions such as pre-fetching and replacement, or for data compression. The method is applicable to any sequence of system events, including file system events, distributed system events such as http requests and low level I/O events. As the I/O gap widens due to advances in processor design, I/O system latency will become a greater hindrance to overall performance. By exploiting the highly related nature of events, the predictive caching method of the present invention reduces I/O system latency and improves overall system performance.

In accordance with one aspect of the invention, by way example, and not of limitation, the present invention reduces memory requirements and computational complexity by partitioning a trie into subtries, where each subtrie represents a first order node (the node directly descendant from the root) and all of its descendants. A static limit is then placed on subtrie size, and subtries are paged with the objects with which they are associated. More particularly, the present invention comprises a "tree pruning" methodology wherein the size of the subtries is limited to a static number chosen as a parameter of the tree pruning method. This static limit is maintained by refreshing parts of the set of children and releasing slots taken when additional space is needed. The determination of which slots to release can be based on metrics such as the frequency with which a sequence occurs, the recency of a sequence, or the comparative costs and benefits of clearing the node versus the comparative costs and benefits of keeping the node. In addition, each partition (subtrie) can be attached to the object which it represents and moved in and out of memory with that object.

In accordance with another aspect of the invention, instead of partitioning the trie based on a set of first order sequences, the trie could be partitioned based on any set of sequences of events and the number of descendants from that sequence of events could be statically limited. In other words, the subtrie size at any order node could be statically limited.

In accordance with another aspect of the invention, the present invention can be used for file caching by further comparing the likelihood estimation derived from the predictive model to a threshold, which is typically on the order of 0.05 to 0.1. If the estimated likelihood is greater than or equal to the threshold, then the data accessed for this event would be pre-fetched into a cache. By augmenting a normal LRU cache with a method in accordance with the present invention that pre-fetches all files with a likelihood estimate of 0.1 or greater, we have found that a 4-megabyte cache could receive as many hits as a 90-megabyte LRU cache.

An object of the invention is to reduce I/O (e.g., file system, network and low level I/O) latency in computer systems.

Another object of the invention is to track events and their sequences.

Another object of the invention is to predict future events.

Another object of the invention is to cache predicted events to reduce access time.

The foregoing objects and advantages are achieved by maintaining a data structure based on the predictive nature of events occurring after an initial event correlating to an object in the system. Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 5 table showing the data structure for the subtrie shown in FIG. 4.

DESCRIPTION OF THE PREFERRED EMBODIMENTS

Figure 1:
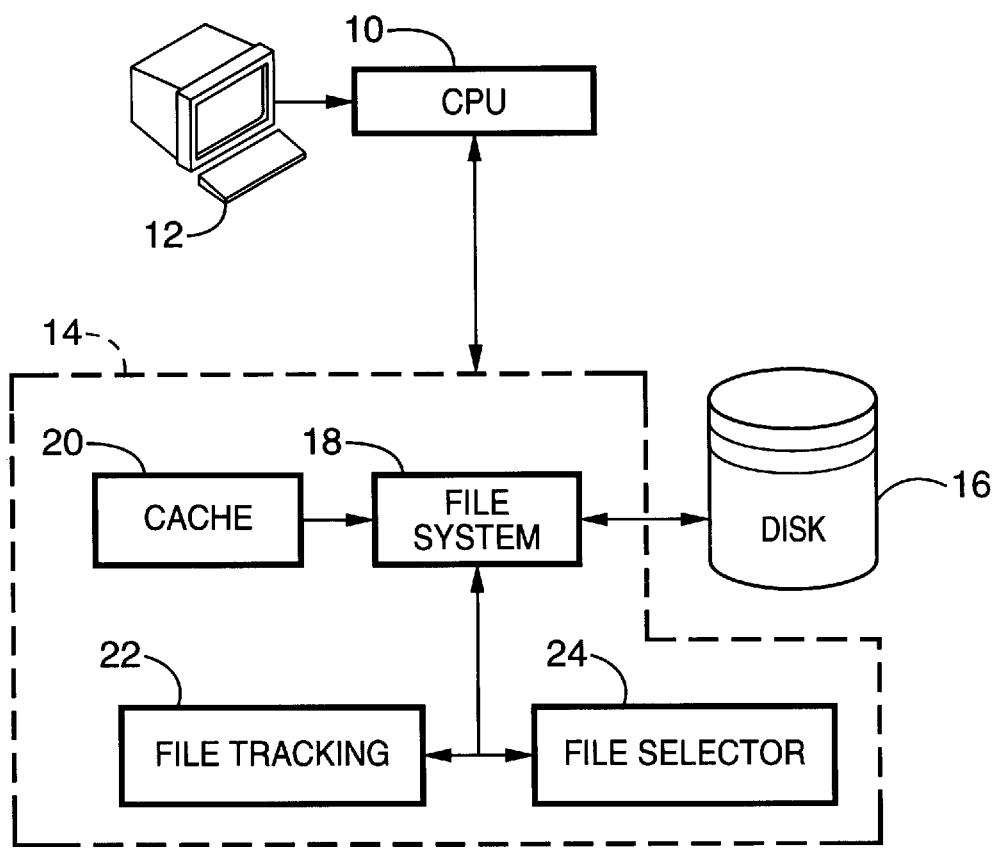
FIG. 1 is a functional block diagram of an embodiment of a predictive file caching system in accordance with the invention.

Referring more specifically to the drawings, where like reference numerals denote like components and steps, the present invention generally comprises a method for tracking events and their sequences, predicting the probability of future events, and using this information for event management such as cache management decisions, including pre-fetching and replacement, or for data compression. It will be appreciated, however, that the apparatus may vary as to configuration and as to details of the components and that the method may vary as to the specific steps and their sequence without departing from the basic concepts as disclosed herein.

1. System Configuration

Referring first to FIG. 1, an example of a computer system incorporating the method of the present invention for predictive file caching is shown for illustrative purposes. It will be appreciated, however, that the present invention can be implemented on stand-alone systems as well as distributed processing systems, and that the method is applicable to any type of computer system.

A typical computer system includes a central processing unit 10 with standard input/output interfaces, a user interface 12 such as a conventional keyboard and video display for accessing central processing unit 10, high speed random access memory (RAM) 14, and a physical storage device 16 such as a fixed disk drive, upon which the operating system, application programs, and data files are stored. Those skilled in the art will appreciate this is a simplified example of a computer and that other hardware devices and input/output connections may be present.

2. File System

For purposes of the discussion herein, reference will be again be made to the computer system shown in FIG. 1 where an exemplary implementation of the invention is provided for predictive file caching to address the problem of file system latency. It will be appreciated, however, that the method of the present invention is applicable to tracking and predicting any sequence of events even though the following discussion is in the context of file caching. Those skilled in the art will appreciate that the hardware and software interfaces between elements shown in FIG. 1 are conventional and do not form a part of the invention.

In the example shown in FIG. 1, the invention is implemented in software as a file system 18 which, in the particular configuration shown, is employed to cache files in a portion of RAM 14 shown as cache 20. It will be appreciated, however, that the invention can be implemented at any level, ranging from hardware to application software. File system 18 is supported by a file access tracking module 22 for tracking sequences of file access events and a file selector module 24 for using the tracked sequences to determine likely future events and pre-fetching their data from disk 16 and caching the data in cache 20. Therefore, the predictive caching method of the present invention can be described in terms of two principal components: (i) an event tracker for tracking sequences of previous events and (ii) a selector for using the tracked sequences to determine likely future events and pre-fetching their data. The event tracker method uses multiorder context modeling wherein a data structure such as a trie stores sequences of previous system events and the number of times they have occurred. The selector examines the most recently seen sequences and the counts of the events that have followed them to determine likely next events. Using these predictions, an LRU cache is augmented by pre-fetching data that are likely to be accessed. This methodology provides a predictive cache with averaged hit ratios better than an LRU cache that is 20 times its size.

(a) Context Modeling

It will be appreciated that in a data processing system many events are closely related. For example, in a file system when a user executes the program "make", this will very often result in accesses to the files "cc", "as", and "ld". Additionally, if we note an access to the files "make" and "makefile" then another sequence of accesses: "program.c", "program.h", "stdio.h" is likely to occur. To a great extent the file system, as most data systems, behaves predictably and, therefore, a predictive caching method that tracks event sequences and notes predictive relationships could exploit such sequences by pre-loading data before it is required. This would increase the cache hit ratio and reduce file system latency.

Just as a word in a sentence occurs in a context, a character in a string can be considered to occur in a context. For example, in the string "object" the character "t" is said to occur within the context "objec". However, it can also be said that "t" occurs within the context "c", "ec", "jec", and "bjec". The length of a context is termed its "order". In the example string, "jec" would be considered a third order context for "t". In text compression these contexts are used to model which characters are likely to be seen next. For example, given that we have seen the context "object" it may be likely that the next character will be a space, or possibly an "i", but it is unlikely that the next character is an "h". On the other hand, if we only consider the first order context, "t", then "h" is likely. This technique of tracking multiple contexts of varying orders is termed a "multi-order context model" and, for purposes of file caching, is adapted to track events and the sequences in which they occur.

To prevent the model from quickly growing beyond available resources, it is necessary to limit the highest order tracked to some finite number m. In other words, the model becomes a "finite multi-order context model." At every point in the string, the next character can be modeled by the last seen contexts (a set of order 0 through m). For example, take the input string "objec" and limit the model to a third order (m=3). The next character can now be described by four contexts {ø, "c", "ec", "jec"}. This set of contexts can be thought of as the current state of whatever is being modeled, whether it is a character input stream or a sequence of events. With each new event, the set of new contexts is generated by appending the newly seen event to the end of the contexts that previously modeled the state. If the above set was the current state at time t, and at time t+1 we see the character "t", our new state is described by the set {ø, "t", "ct", "ect"}.

The nature of a context model, where one set of contexts is built from the previous set, makes it well suited for a trie, where the children of each node indicate the events that have followed the sequence represented by that node. A trie is commonly used as a data structure to hold a dictionary of words, and is based on a tree in which each node contains a specific character. Each node represents the sequence of characters that can be found by traversing the tree from the root of that node. A resulting property of this trie is that the frequency count for each current context is equal to the sum of its children's counts plus one. Therefore, this property can be used to derive a probability estimate.

(b) Tracking Events

Where contexts are sequences of events, a data structure such as a trie can be used to store all of the previously seen contexts, with each node in the trie representing a specific event. Through its path from the root, each node identifies a sequence of events, or a context, that has been previously seen. Within each node, the number of times this sequence has occurred is also maintained.

To easily update the model and use it to determine likely future events, an array of pointers, 0 through m, is maintained that indicate the nodes which represent the current contexts ($C_0$ through $C_m$). With each new event E, this array of pointers to contexts is regenerated as follows: the children of each current context ($C_{k-1}$) are examined, searching for a child that represents the event E. If such a child exists, then this sequence has occurred before so we set the new $C_k$ (the $k^{th}$ element of the array) to point to this child and increment its count. If no such child is found, then this is the first time that this sequence has occurred, so we create a child denoting the event E and set the $k^{th}$ element of the array to point to its node. Once we have updated each context in our set of current contexts, we have a new state that describes our file system.

(c) Determining Event Likelihood

As each of the new contexts is generated, their children (if any) are examined to determine how likely they are to be the next event. Using the formula $Count_{child}/Count_{parent}-1$, a maximum-likelihood estimation of the probability P of that child's event occurring is generated. This estimate is then compared to a predetermined probability threshold. If the estimated likelihood is greater than or equal to this threshold, then the data accessed for this event is pre-fetched into the cache. Each context 1 through m is evaluated independently, resulting in m sets of predictions.

Pre-fetched data is placed at the front of the cache and, since cache replacement is still LRU, the data will most likely be in the cache for the next several events. The result is that, although the pre-fetching is based on a prediction for the next event, if this predicted event occurs before its data is removed from the cache we still avoid a cache miss.

It will also be appreciated that the prediction can be used for cache management decisions without the threshold comparison described above.

In a file caching implementation, the likelihood estimation can be used to select which information to pre-fetch into an LRU cache. If the estimated likelihood is greater than or equal to the threshold, then the data accessed for this event would be pre-fetched into a cache. Note that each context 0 through m is evaluated independently, thus resulting in m sets of predictions. Also, once pre-fetched, the data will most likely be in the cache for the next several events. So long as this predicted event occurs before it is bumped out of the cache, there is still the potential to avoid a cache miss. Therefore, even though the predictions are based on likelihood for the event, performance improvements occur because on average the likelihood of access to the data pre-fetched is greater than that of the data removed from the cache because of the pre-fetch. In simulations, we have found that pre-fetching with a threshold of 0.01 or greater can cause an LRU cache to increase performance by greater than 20 times. In particular, we found that by augmenting a normal LRU cache with the method of the present invention, a 4-megabyte cache can receive as many hits as a 90-megabyte LRU cache.

EXAMPLE 1

Sample Trie Construction

Referring to FIG. 2A through FIG. 2J, the construction of a trie in accordance with the present invention for the file sequence CACBCAABCA is shown with a limit to third order contexts. Also, assume that the pre-fetch threshold is 0.1. In this example, R denotes the root of the tree and an underscore denotes a current context. Note that the root R is always a current context. Changes in the trie only occur at the nodes which are designated as a current context and take the form of adding a child or incrementing the count of an existing child below the current context. Once a child is added or the count of an existing child is incremented, the new current contexts are set as the children of the old current context that have changed.

Figure 2A:
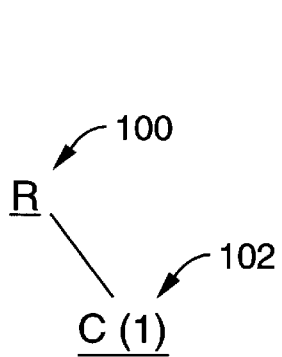
FIG. 2A through FIG. 2J schematically show the development of a third order context trie in accordance with the invention corresponding to the event sequence CACB-CAABCA.

FIG. 2A shows the first addition to a null trie after the event C has been seen. Starting with the root 100 as the current context, a node 102 is added as a child of the root to reflect that event. Since this was the first occurrence of event C, it is assigned a count of "1". Also, since it is a child of an old current context, node 102 is underscored as a new current context. Since there is no child of the current context node 102, the probability P is zero.

Figure 2B:
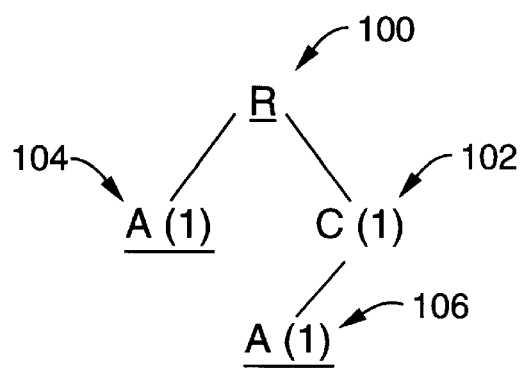

In FIG. 2B, event A is now seen. Since event A is a child of current context R, a node 104 is added and set as a current context. At the same time, event A is also a child of event C and a node 106 is added and set as a current context. The previous current contexts are cleared, except for the root R which is always maintained as a current context. Since there is no child of the either node 104 or node 106, the probability P for either node is zero.

Figure 2C:
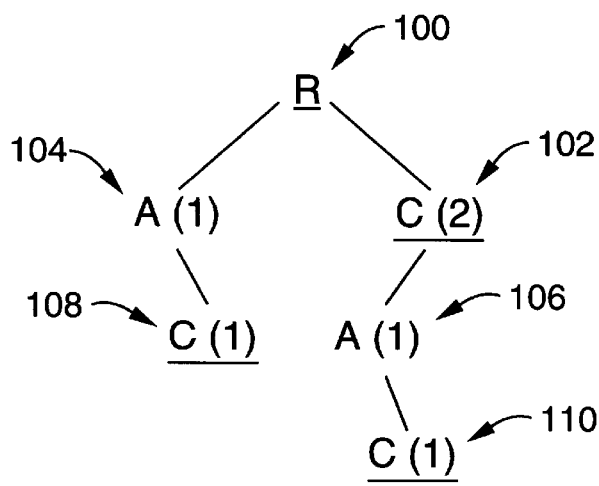

FIG. 2C shows the addition of another event C. Here, several changes take place. First, since this event is already a child of the root R, a new node is not added directly below the root. Instead, the count for the existing node 102 is incremented and set as a current context. Since node 104 was a current context, a node 108 is added as a child to represent this new event and is set to a current context. Since node 106 was also a current context, a node 110 is added as a child and set as a new current context. Again, the previous current contexts are then cleared except for the root R. Also, since node 102 is a current context having a child, a probability P for the sequence represented by the child's node can be determined as 1/(2−1)=1. This would result in a pre-fetch operation taking place.

At this point, it can be seen that each time a new event occurs, each of the nodes is scanned starting with the root. If the new event does not exist as the child of the root, a node for the new event is added as a child of the root and the node is set to a current context. If the event already exists as a child of the root, the count for that node is incremented and the node is set to a current context. The nodes are then scanned further down the trie until a current context is reached. If the current context is the same as the new event, then the count is incremented. Otherwise, the new event is added as a child of the node in the current context. This process is repeated for all current contexts.

Figure 2D:
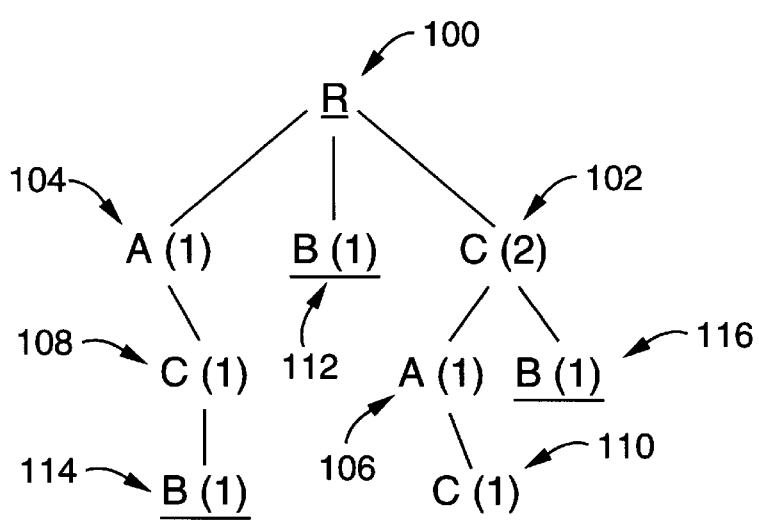

In FIG. 2D, the event B is seen. As a result, a node 112 is added as a child of the root and set as a current context. A node 114 is also added as a child of node 108 which was in the current context. Further, a node 16 is added as a child of node 102 which was also in the current context. Note, however, that a node was not added as a child of node 110 which was also in the current context. The reason is that the size of the trie is being limited in this example to third order contexts to prevent it from growing too large. Further, no pre-fetching will take place at this point.

Figure 2E:
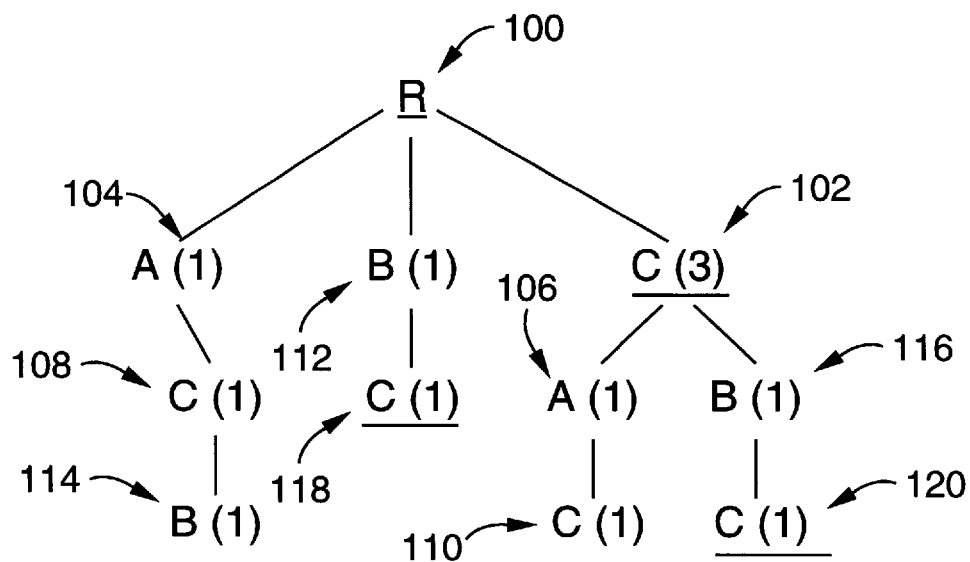

In FIG. 2E, the event C is seen once again. The event is not added as a child of node 114 because of the limit to third order contexts. However, a node 118 is added as a child of node 112 and set as a current context. Also, the count of node 102 is incremented and set as a current context since this is a further occurrence of a child of the root. Lastly, a node 120 is added as a child of node 116 and set as a current context. Pre-fetching will occur for two sequences; the sequence represented by node 106 (the child of node 102) having a probability of 1/(3−1)=0.5, and the sequence represented by node 116 (also a child of node 102) having a probability of 1/(3−1)=0.5.

Figure 2F:
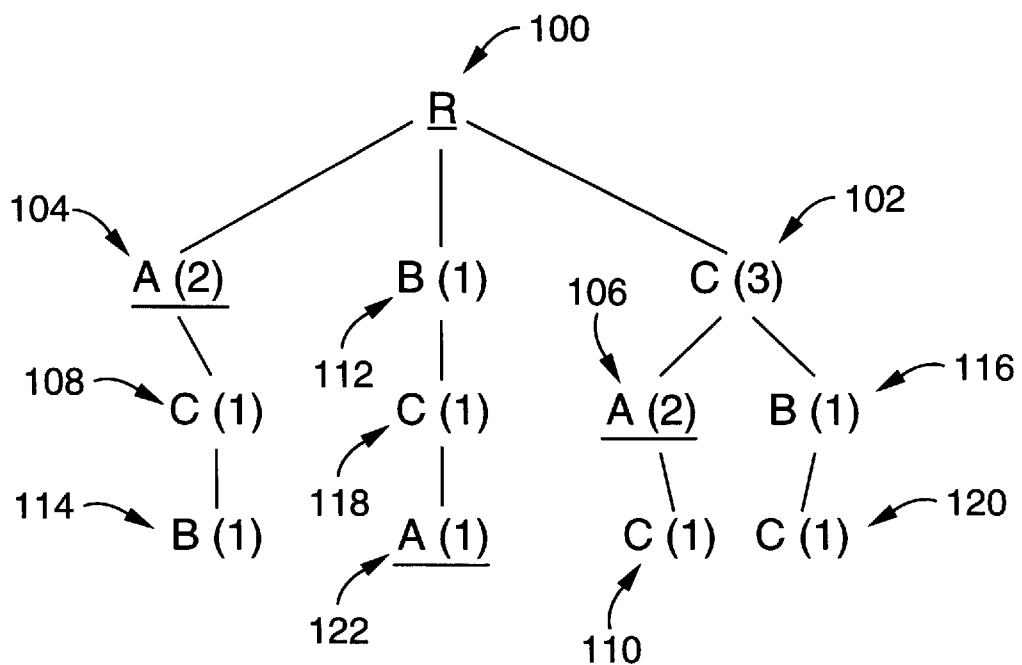

Referring now to FIG. 2F, the event A is seen again. As a result, the count of node 104 is incremented and set as a current context. Also, a node 122 is added as a child of node 118 and set as a current context. Further, node 116 is incremented and set as a current context. However, the event is not added as a child of node 120 because of the limit to third order contexts. The probability of the sequence represented by node 108 is 1/(2−1)=1 so that pre-fetching will occur for that sequence. Further, the probability of the sequence represented by node 110 is 1/(2−1)=1 so that pre-fetching will also occur for that sequence.

Figure 2G:
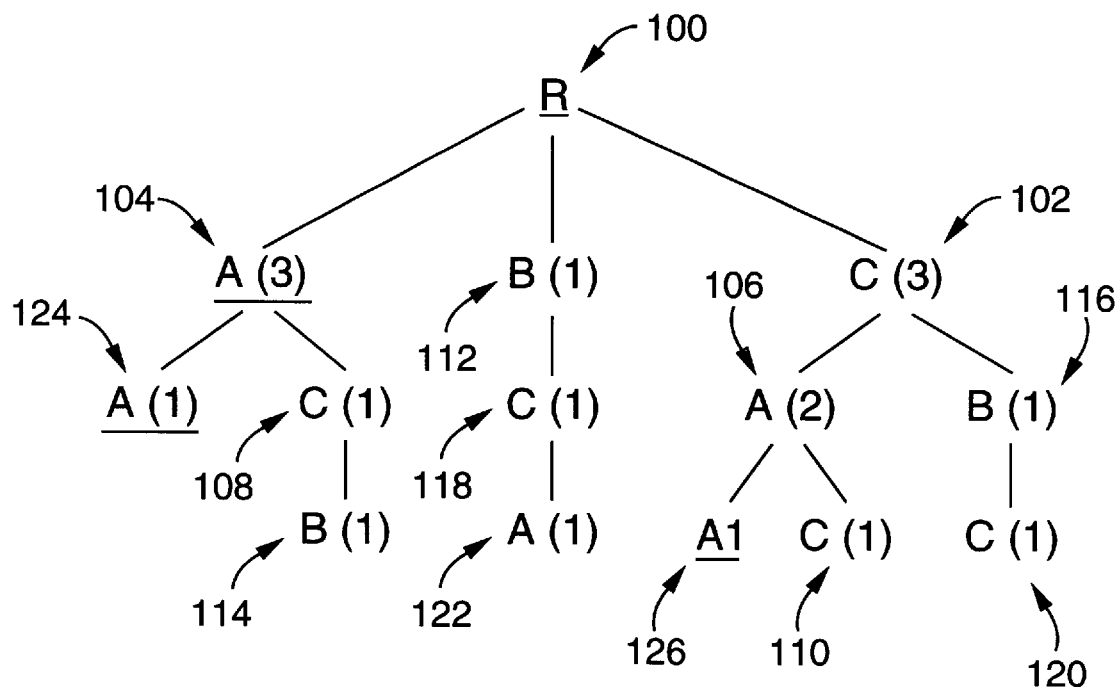

FIG. 2G shows how the trie further develops when the event A is seen once again. Here, the count of node 104 is incremented and set as a current context. However, since node 104 was already a current context, a node 124 is added as a child and also set as a current context. A node cannot be added as a child of node 122 because of the limit to third order contexts. Also, a node 126 is added as a child of node 106 and set as a current context. Pre-fetching will occur for the sequence represented by node 124 since the probability is 1/(3−1)=0.5.

Figure 2H:
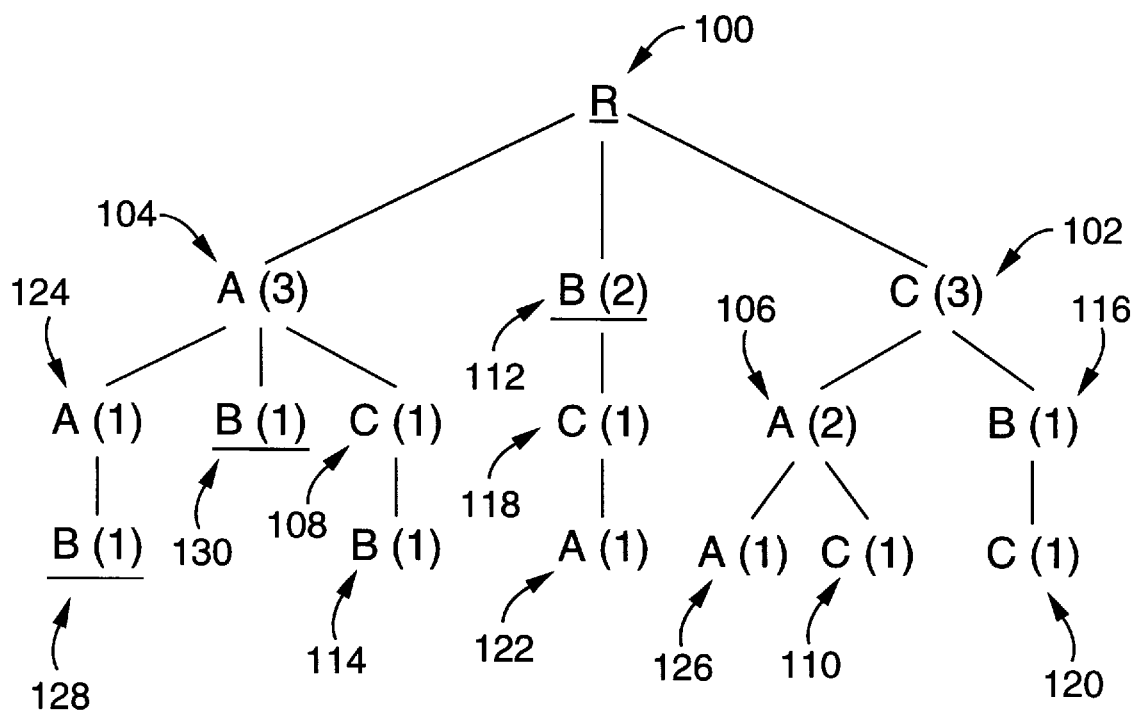

In FIG. 2H, the trie is further expanded as a result of the event B being seen again. Here, a node 128 is added as a child of node 124 and set as a current context. Also, a node 130 is added as a child of node 104 and set as a current context. Lastly, the count of node 112 is incremented and set as a current context. However, due to the limit to third order contexts, a node is not added as a child of node 126. Pre-fetching will occur for the sequence represented by node 118 since the probability is 1/(2−1)=1.

Figure 2I:
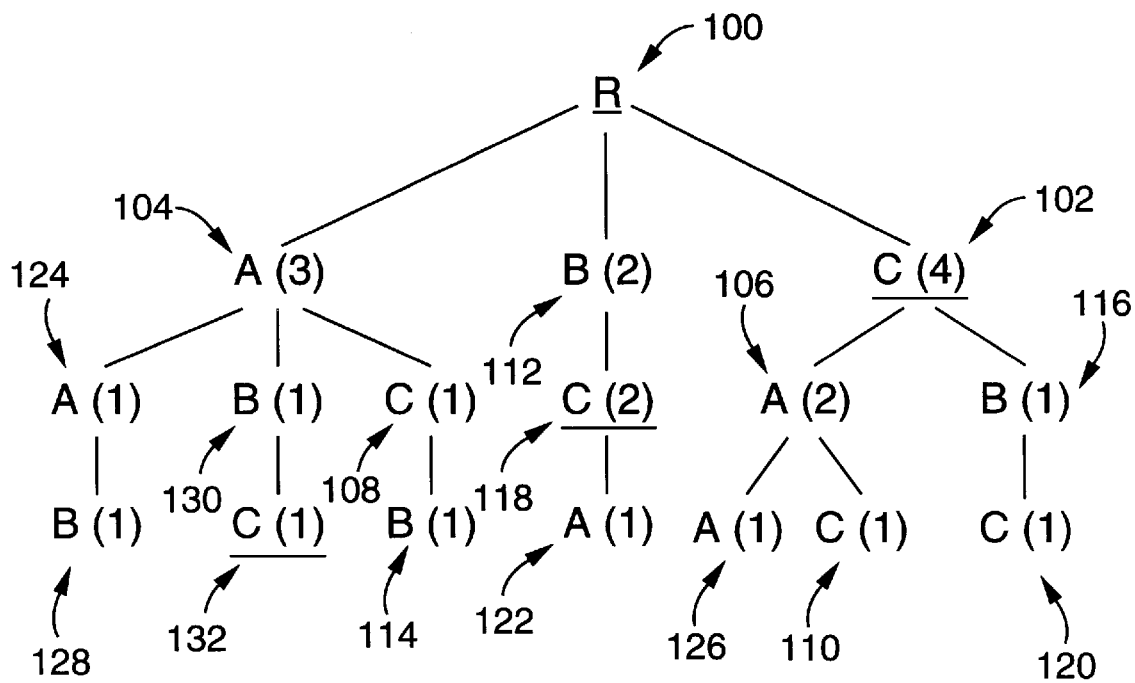

Referring to FIG. 2I, the event C is now seen again. A node is not added as a child of node 128 because of the context order limit. A node 132 is added as a child of node 130 and set as a current context. The count of node 118 is incremented and set as a current context. Lastly, the count of node 102 is incremented. Pre-fetching will occur for the sequences represented by nodes 106, 116 and 122.

Figure 2J:
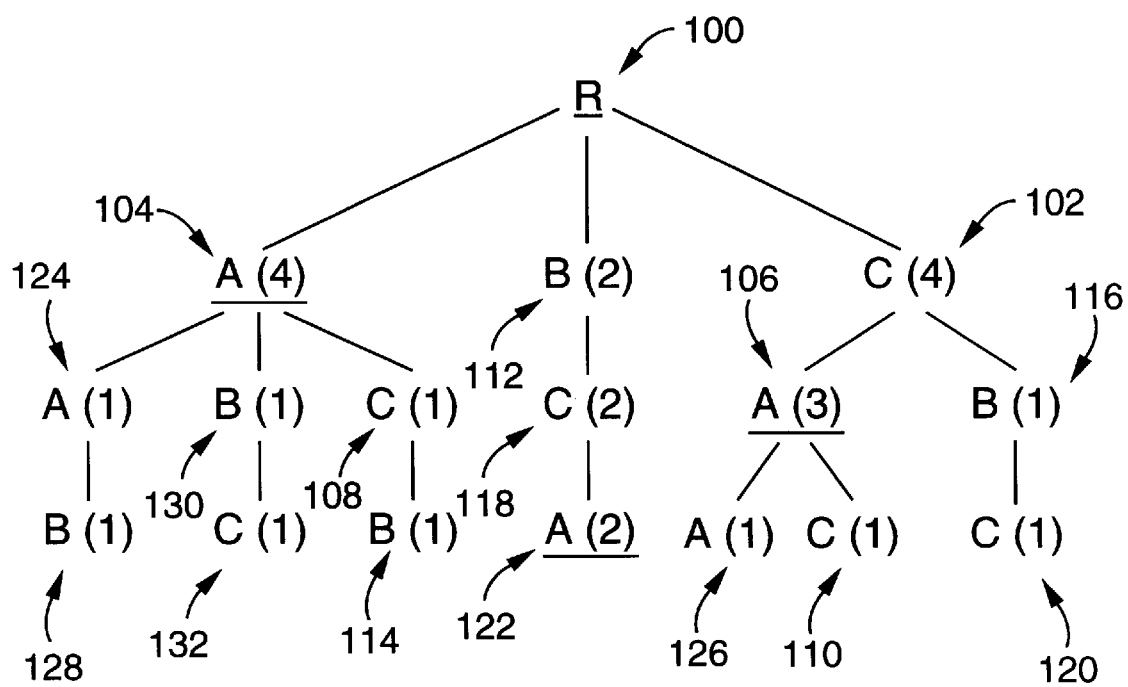

Lastly, in FIG. 2J, the event A is seen again. A node is not added as a child of node 132 due to the context order limit. The count of node 126 is incremented, however, as is the count of node 106. Both nodes are then set as a current context. Pre-fetching will occur for the sequences represented by nodes 110, 124, 126 and 130.

Figure 3:
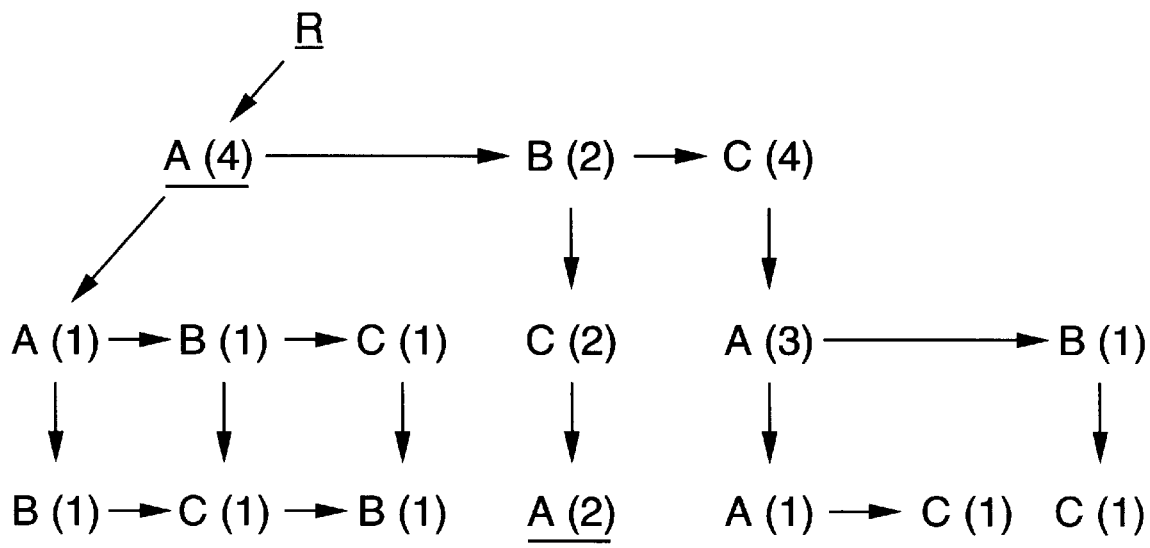
FIG. 3 schematically shows the pointer relationship for the trie of FIG. 2J.

The nodes in the trie and the trie structure are is maintained as a plurality of entries in an array. Each node is stored with a unique object identifier for the file that was accessed, a count associated with that node, a pointer to the first of that node's children and a pointer to the next sibling of that node. For example, FIG. 3 shows the pointer relationship for the trie shown in FIG. 2J. A separate pointer array is used to maintain pointers to each current context in the trie array.

EXAMPLE 2

Simulations

To simulate the workload of a system, file open events were used from Sprite file system traces described in Baker et al., *Measurements of a Distributed File System*, Proceedings of 13$^{th}$ Symposium on Operating Systems Principles, pages 198–212, ACM, October 1991. The file system traces were split into eight 24 hour periods lettered A through H. Given the time frame and environment under which these traces were generated, a cache size of four megabytes was chosen as a reasonable size for purposes of initial tests. After developing an understanding of how the various parameters effected performance, performance of the invention was explored for cache sizes up to 256 megabytes.

Various probability thresholds were examined to determine which would result in the best cache hit ratios. Threshold settings from approximately 0.001 to 0.25 were tested.

while fourth and higher orders appeared to offer negligible improvements. Therefore, second or third order models appear to provide the best results.

EXAMPLE 4

Improvements Over LRU

The predictive file caching method of the present invention was compared to an LRU cache. For this comparison, both caches simulated four megabytes of cache memory. The predictive cache was configured to extend to the second order and to pre-fetched at a conservative threshold of 0.1. Table 1 shows the results of these simulations.

TABLE 1

| Trace | A | B | C | D | E | F | G | H |
|---|---|---|---|---|---|---|---|---|
| Invention | 56.1% | 74.6% | 75.0% | 73.2% | 77.1% | 70.0% | 77.7% | 79.8% |
| LRU | 48.5% | 59.7% | 59.8% | 57.2% | 54.9% | 54.0% | 58.4% | 68.8% |
| Improvement | 7.6% | 14.9% | 15.2% | 16.0% | 22.2% | 16.0% | 19.3% | 11.0% |

It was found that a setting in the region of approximately 0.05 to 0.1 offered the best overall performance. While we expected this setting to be quite low, it is surprising that such an aggressive prefect threshold produced the best results. To explain this, we first consider that each trace is comprised of over 10,000 distinct files. Since each of these files can be a child to any node, the tree we build will become very wide. Since the count for each parent is the sum of the counts for its children, such a wide tree would result in parents with much higher counts than their individual children. It follows that the parent count divided by the count of children would be rather low even for children that frequently follow their parent.

For settings greater than 0.025, performance did not change radically with minor variations. However for settings below 0.025 we see a sharp drop in performance as a result of pre-fetching too many files. Thus the invention is stable for settings of the probability threshold that are greater than approximately 0.025.

An initial concern was that low threshold settings might result in pre-fetching an impractical number of files. This was not found to be the case, however. In fact, for a probability threshold of 0.075, the average number of files pre-fetched per open event ranged from 0.21 to 1.10 files. For extremely low threshold settings, such as below 0.025, the number of files pre-fetched quickly becomes prohibitive. However, for settings in the region of 0.05 to 0.1, it was found that the average number of files pre-fetched would not impose an excessive load.

EXAMPLE 3

Maximum Order of the Model

To see how much benefit was gained from each order of modeling, we simulated models of order ranging from zero through four. Since we ignore the predictions of the zero order model, a zero order cache does not pre-fetch and, therefore, is equivalent to an LRU cache. While we expected to gain mostly from the first and second orders, the second order improved performance more than we had expected, As can be seen, the predictive cache of the present invention clearly offered significant improvements to the performance of an LRU cache on all eight traces, averaging 15% more cache hits than LRU and in the case of trace E as much as 22% more.

EXAMPLE 5

Cache Size

Another concern was whether the benefit from our predictive cache would quickly diminish as the size of our cache grew. In order to investigate this, an LRU cache and a predictive cache in accordance with the invention were simulated for varying cache sizes up to 256 megabytes. It was found that the predictive cache of the present invention provides a performance gain that will not be easily overcome by increasing the size of an LRU cache. For example, on average it would require a 90 megabyte LRU cache to match the performance of a 4 megabyte predictive cache in accordance with the invention.

3. Tree Pruning and Memory Reduction

A significant drawback of predictive models such as PPM when dealing with large or continuous sequences of events is that that computation complexity will increase as the size of the trie grows. As can be seen from the foregoing, the size of the trie will increase as the number of events tracked increases. The number of first order nodes corresponds to the number of distinct events that have occurred, and the number of nodes in the trie corresponds to the number of distinct sequences observed. When dealing with a small amount of data or data of a finite size, memory requirements may generally be manageable. In a file system, files are frequently created and deleted resulting in a very dynamic stream of events and one with a rather large number of distinct events. When tracking a large number of events such as in a file system, or when compressing a continuous stream of data, the trie will grow very large and memory requirements can be significant even though the maximum order of the trie is static.

For example, the amount of memory required for a predictive cache as described above is directly proportional to the number of nodes in the trie. On average, a second order model would require approximately 238,200 nodes. In this case, the memory required by the model can approach the size of the cache that it models. In particular, the models can grow as large as $N^O$ where N is the number of objects modeled and $O$ is the model order. This can lead to an enormous data structure which drives the computational complexity of predictions to be on the order of O×N.

In order to reduce memory requirements and, therefore, computational complexity, the present invention partitions the trie into subtries, where each subtrie is a partition that represents a first order node (the node directly descendant from the root) and all of its descendants. In other words, the maximum number of descendants of a first order node is a static number which is set as a parameter of the invention. As more space is needed to record events in the trie, parts of the set of children are refreshed by releasing slots based on metrics such as frequency, recency or a benefit/cost comparison as more fully described below. Hence, high speed memory requirements (e.g., amount of RAM) are reduced substantially in comparison to a trie that is allowed to grow beyond a reasonable size. These memory requirements can then be reduced even further by attaching the subtrie to the object being manipulated and moving the subtrie in and out of memory with that object.

Figure 4:
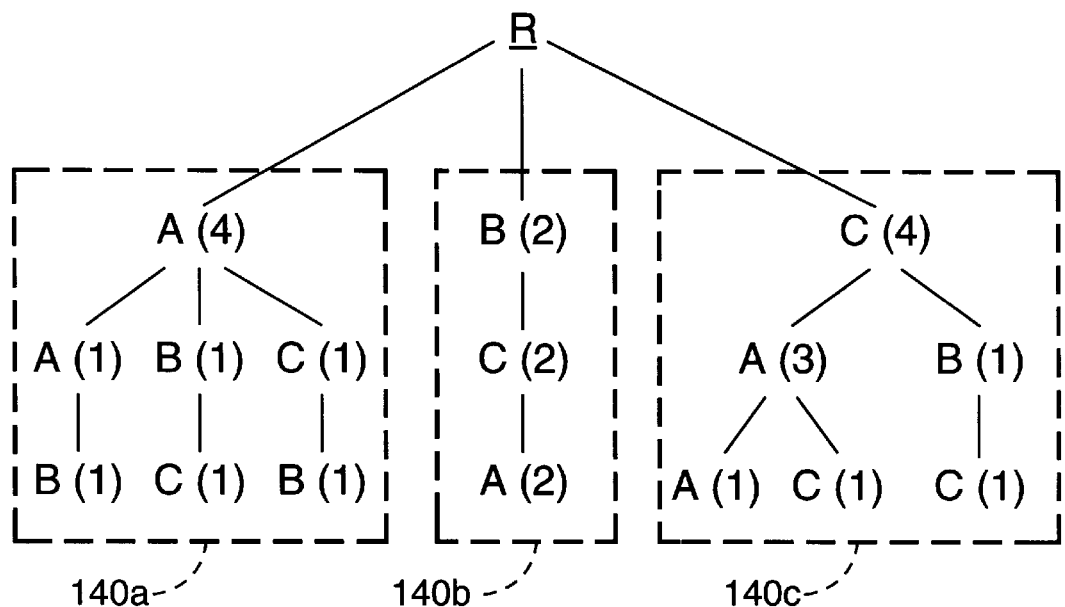
FIG. 4 shows a typical data structure for a subtrie having sixteen nodes.

For example, referring to FIG. 4 which corresponds to FIG. 2J in a simplified form, three subtries 140a, 140b, 140c are shown where each subtrie corresponds to a first order node. Each subtrie is made a static size data structure comprising N nodes, where N is preferably a power of two and would typically have a value of sixteen; that is, a node would be limited to fifteen descendants. While the size of N can be greater, this size has been found to be a practical limit in simulations. The data structure for such a subtrie is shown in FIG. 5. Using this data structure, the overall size of a subtrie would be approximately 176 bytes where the object identifier is allocated 64 bits, the count is allocated 16 bits, the pointer to the first child is allocated 4 bits and the pointer to the first sibling is allocated 4 bits. Thus each node is allocated 88 bits (11 bytes). It is important to note that the size of the data structure will be limited to N which, in turn causes the computational complexity to become order O. Since order O is a static parameter of the method, it can be said that the method works in constant time and linear space.

It will be appreciated that each subtrie defines the predictive behavior that has been seen after an access to the object or event it represents. For example, subtrie 140a represents the predictive behavior after event A, subtrie 1 04b represents the predictive behavior after event B and subtrie 140c represents the predictive behavior after event C. Accordingly, subtrie 104a shows what happened after event A and, therefore, the predictive behavior after the next occurrence of event A. Since the number of descendants of the first order node is fixed, when the subtrie is full and a new node needs to be added in the given example, the subtrie is pruned by dividing all of the counts by an empirically determined value, such as two, and clearing nodes with a count of zero based on integer division (e.g., fractional portions less than zero are truncated to zero).

By "clearing a node" we are referring to refreshing the node by replacing it with new data; that is, overriding the data associated with the node. It will be appreciated, however, that not all nodes with zero counts may need to be cleared; instead, nodes only need to be cleared as they are needed. For example, assuming eight nodes, three of which have counts of one and five of which have counts greater than one, after dividing by two there will be three nodes with counts of zero. Typically, however, only one new node is required at a time. If each of the nodes with zero counts are cleared when fewer nodes are required, there will be unused memory. Therefore, the only nodes cleared are those that are required as slots for the new events, and the remaining nodes with zero counts are left unchanged so that their data can be used for predicting future events. In the example given, only one node would be cleared and the remaining two would be left intact.

It will also be appreciated that other metrics such as "recency" or a "benefit/cost" comparison could be used to determine which node to clear. For example, instead of clearing a node based on a frequency count as described above, we could use a metric of "recency," that is, we could track how recently certain sequences have occurred and release a node if the sequence has not occurred within a specified time metric. Or, we could clear a node based on the comparative costs and benefits of clearing the node versus the comparative costs and benefits of keeping the node. Furthermore, these metrics could be applied in any combination to determine which node should be cleared for the incoming event.

Lastly, the present invention can further reduce memory requirements by bringing data structures in and out of high speed memory with the event or object which they represent instead of keeping them in memory at all times. In the example shown in FIG. 4 and FIG. 5, the subtries 140a, 140b, 140c are brought in and out of memory with the events which they represent: A, B or C, respectively. Where the number of descendants is limited to fifteen, first order node and the subtries representing those descendants are treated as one node having sixteen slots which requires 176 bytes of memory. Since the number of descendants is limited, the amount of maximum amount of memory will be limited and will be a known quantity.

Note also that, instead of partitioning the trie based on a set of first order sequences, the trie could be partitioned based on any set of sequences of events and the number of descendants from that sequence of events could be statically limited. In other words, the subtrie size at any order node could be statically limited.

The foregoing techniques will not only significantly reduce the memory requirements of the model, but will also allow it to adapt to patterns of local activity. Further, limiting the number of children a node can have will also ensure that the time required to update the model and predict new accesses is limited to a constant factor. The result is that the method works in linear space, runs in constant time, and adapts to changes in an event's predictive nature.

4. Data Compression

As explained in the background of the invention, data compression has been used to drive a virtual memory cache where a finite number of most probable items are pre-fetched, and that *Prediction by Partial Match* (PPM) is a known data compression modeling technique used successfully for pre-fetching in operating systems. The PPM technique models data sequences and determines probabilities prior to encoding the data sequences to achieve compression. Therefore, the method of the present invention can be combined with PPM by modifying PPM to use subtries and pruning techniques as described herein instead of PPM's internal statistical model. The result would be a faster running data compression technique, although the degree of compression may be slightly lower.

5. Performance Enhancements (a) Predicting from Grandparents

It will be appreciated that it is possible for one event to be the cause of two future events that occur closely. As a result, the order of these two events may vary. For example, an open of file "B" could cause opens to files "A" and "C" with one of two resulting sequences "BAC" or "BCA". Therefore, an extension of the method of the present invention is to use all of the descendants of a context to predict possible variations in the ordering of events. For example, referring to FIG. 2J, if an open of file "B" takes place then the method would not only pre-fetch file "C" but also file "A" as well. Such a forward-looking prediction would prevent cache misses for the sequence "BAC" as well as "BCA".

(b) Modifications to the Pre-fetching Method

An additional extension of the method of the present invention is to improve performance by using a combination of selecting the n most likely items and the threshold based selection by placing a limit on the number of events that can be pre-fetched. Performance may also improve as a result of using different threshold settings for each order of the model.

(c) Predictive Replacement

While the cache of the present invention is based on a predictive model to pre-fetch files, it still uses LRU to determine which files to expel from the cache when space is needed. Using a predictive model to determine cache replacements may offer further improvements in performance.

(d) Selection by Cost Comparison

Finally performance may improve with a pre-fetching selection model that uses the estimated probabilities of the present invention in conjunction with other factors, such as memory demand and file size, to estimate the cost, in terms of read-wait times. These estimates would be used in each case to decide if it was more beneficial to pre-fetch or not. It is possible that such a parameterless selection method will adjust to changing file system behavior.

Accordingly, the present invention provides a method for effectively predicting future events using a data structure based on the predictive nature of the system after an initial event correlation to an object in the system. A convenient data structure is a trie, having multiple nodes that represent objects, although other common data structures could alternatively be used.

Although the description above contains many specificities, these should not be construed as limiting the scope of the invention but as merely providing illustrations of some of the presently preferred embodiments of this invention. Thus the scope of this invention should be determined by the appended claims and their legal equivalents

We claim:

1. A predictive event tracking method, comprising the steps of:

(a) monitoring a plurality of events in a computer system, wherein each said event is associated with an object being manipulated;

(b) recording said events as elements in a data structure having a plurality of substructures wherein each said substructure is associated with a distinct initial event and wherein each said substructure contains elements corresponding to events occurring after said associated initial event, wherein said data structure comprises a trie, wherein said substructures comprise subtries, and wherein said events are recorded as nodes in said trie;

(c) limiting the number of elements in each said substructure;

(d) designating a node as a current context when that node is recorded in the trie;

(e) maintaining a count associated with each node in the trie; and (f) incrementing the count associated with a node and designating that node as a new current context if a new event is the same as a previous event represented by that node and that node is a child of a node that is a current context.

2. A method as recited in claim 1, further comprising the step of periodically refreshing said substructures by releasing elements in said substructures.

3. A method as recited in claim 1, further comprising the steps of attaching each substructure to its corresponding object being manipulated and moving said substructure in and out of memory with the object.

4. A method as recited in claim 1, further comprising the steps of:

(g) for each node that is designated as a new current context,
(i) dividing the count associated with a child of said node by the count associated with said node less one to obtain a probability estimate, and
(ii) storing the input/output object associated with the event represented by said child in a memory cache as a function of said probability estimate.

5. A method as recited in claim 1, further comprising the steps of adding a child to a current context and designating the child as a new current context if no child of said current context represents said new event.

6. A predictive event tracking method, comprising the steps of:

(a) monitoring a plurality of events in a computer system, wherein each said event is associated with an object being manipulated;

(b) recording said events as elements in a data structure representing the predictive nature of the system after an initial event associated with each object in the system;

(c) organizing said elements in a plurality of substructures wherein each said substructure is associated with a distinct initial event and wherein each said substructure contains elements corresponding to events occurring after said associated initial event, wherein said data structure comprises a trie, wherein said substructures comprise subtries, and wherein said events are recorded as nodes in said trie;

(d) limiting the number of elements in each said substructure;

(e) desicinating a node as a current context when that node is recorded in the trie;

(f) maintaining a count associated with each node in the trie; and (g) incrementing the count associated with a node and designating that node as a new current context if a new event is the same as a previous event represented by that node and that node is a child of a node that is a current context.

7. A method as recited in claim 6, further comprising the step of periodically refreshing said substructures by releasing elements in said substructures.

8. A method as recited in claim 6, further comprising the steps of attaching each substructure to its corresponding object being manipulated and moving said substructure in and out of memory with the object.

9. A method as recited in claim 6, further comprising the steps of:
   (h) for each node that is designated as a new current context,
      (i) dividing the count associated with a child of said node by the count associated with said node less one to obtain a probability estimate, and
      (ii) storing the input/output object associated with the event represented by said child in a memory cache as a function of said probability estimate.

10. A method as recited in claim 6, further comprising the steps of adding a child to a current context and designating the child as a new current context if no child of said current context represents said new event.

11. A predictive event tracking method, comprising the steps of:
   (a) monitoring a plurality of events in a computer system, wherein each said event is associated with an object being manipulated;
   (b) recording said events as elements in a data structure, said data structure having a root, said data structure having a first order node that corresponds to an initial event, said data structure having a plurality of descendants corresponding to events occurring after said initial event, wherein said first order node extends from said root and said descendants extend from said first order node, wherein said data structure comprises a trie and wherein said events are recorded as nodes in said trie;
   (c) limiting the number of descendants of said first order node;
   (d) designating a node as a current context when that node is recorded in the trie;
   (e) maintaining a count associated with each node in the trie; and
   (f) incrementing the count associated with a node and designating that node as a new current context if a new event is the same as a previous event represented by that node and that node is a child of a node that is a current context.

12. A method as recited in claim 11, further comprising the step of periodically refreshing said data structure by replacing descendants in said data structure.

13. A method as recited in claim 11, further comprising the steps of attaching said first order node and its descendants to the corresponding object being manipulated and moving said first order node and descendants in and out of memory with the object.

14. A method as recited in claim 11, further comprising the steps of:
   (g) for each node that is designated as a new current context,
      (i) dividing the count associated with a child of said node by the count associated with said node less one to obtain a probability estimate, and
      (ii) storing the input/output object associated with the event represented by said child in a memory cache as a function of said probability estimate.

15. A method as recited in claim 11, further comprising the steps of adding a child to a current context and designating the child as a new current context if no child of said current context represents said new event.

16. A predictive event tracking method, comprising the steps of:
   (a) monitoring a plurality of events in a computer system, wherein each said event is associated with an object being manipulated;
   (b) recording said events as elements in a data structure having a plurality of substructures wherein each said substructure is associated with a distinct initial event and wherein each said substructure contains elements corresponding to events occurring after said associated initial event, wherein said data structure comprises a trie, wherein said substructures comprise subtries, and wherein said events are recorded as nodes in said trie;
   (c) limiting the number of elements in each said substructure;
   (d) designating a node as a current context when that node is recorded in the trie;
   (e) maintaining a count associated with each node in the trie;
   (f) for each new event, examining the children of a current context and determining if a child represents the event, and
      (i) if such a child exists, designating the child as a current context and incrementing its count;
      (ii) if such a child does not exist, adding a child to the current context and designating the child as a new current context; and
   (g) for each new current context,
      (i) dividing the count of a child associated with the new current context by the count of new current context less one to obtain a probability estimate, and
      (ii) storing the input/output objects associated with the sequence of events represented by said child in a memory cache as a function of said probability estimate.

17. A predictive event tracking method, comprising the steps of:
   (a) monitoring a plurality of events in a computer system, wherein each said event is associated with an object being manipulated;
   (b) recording said events as elements in a data structure representing the predictive nature of the system after an initial event associated with each object in the system;
   (c) organizing said elements in a plurality of substructures wherein each said substructure is associated with a distinct initial event and wherein each said substructure contains elements corresponding to events occurring after said associated initial event, wherein said data structure comprises a trie, wherein said substructures comprise subtries, and wherein said events are recorded as nodes in said trie;
   (d) limiting the number of elements in each said substructure;
   (e) designating a node as a current context when that node is recorded in the trie;
   (f) maintaining a count associated with each node in the trie; and
   (g) for each new event, examining the children of a current context and determining if a child represents the event, and
      (i) if such a child exists, designating the child as a current context and incrementing its count;
      (ii) if such a child does not exist, adding a child to the current context and designating the child as a new current context; and (h) for each new current context,
   (i) dividing the count of a child associated with the new current context by the count of new current context less one to obtain a probability estimate, and
   (ii) storing the input/output objects associated with the sequence of events represented by said child in a memory cache as a function of said probability estimate.

18. A predictive event tracking method, comprising the steps of:
   (a) monitoring a plurality of events in a computer system, wherein each said event is associated with an object being manipulated;
   (b) recording said events as elements in a data structure, said data structure having a root, said data structure having a first order node that corresponds to an initial event, said data structure having a plurality of descendants corresponding to events occurring after said initial event, wherein said first order node extends from said root and said descendants extend from said first order node, wherein said data structure comprises a trie and wherein said events are recorded as nodes in said trie;
   (c) limiting the number of descendants of said first order node;
   (d) designating a node as a current context when that node is recorded in the trie;
   (e) maintaining a count associated with each node in the trie; and
   (f) for each new event, examining the children of a current context and determining if a child represents the event, and
      (i) if such a child exists, designating the child as a current context and incrementing its count;
      (ii) if such a child does not exist, adding a child to the current context and designating the child as a new current context; and
   (g) for each new current context,
      (i) dividing the count of a child associated with the new current context by the count of new current context less one to obtain a probability estimate, and
      (ii) storing the input/output objects associated with the sequence of events represented by said child in a memory cache as a function of said probability estimate.

* * * * *